(12) United States Patent
Sadri et al.

(10) Patent No.: US 6,325,582 B1
(45) Date of Patent: Dec. 4, 2001

(54) SWAGE TYPE FASTENER WITH LOW SWAGE LOAD

(75) Inventors: Shahriar M. Sadri, San Clemente; Thomas E. Harbin, Westminster, both of CA (US)

(73) Assignee: Huck International, Inc., Tucson, AZ (US)

( * ) Notice: Subject to any disclaimer, the term of this patent is extended or adjusted under 35 U.S.C. 154(b) by 0 days.

(21) Appl. No.: 09/611,132

(22) Filed: Jul. 6, 2000

(51) Int. Cl.⁷ ........................................ F16B 19/05
(52) U.S. Cl. .................................................. 411/361
(58) Field of Search ............................ 411/361, 43, 69, 411/281, 3; 29/515, 520

(56) References Cited

U.S. PATENT DOCUMENTS

| | | |
|---|---|---|
| 2,531,048 | 11/1950 | Huck . |
| 2,531,049 | 11/1950 | Huck . |
| 2,804,798 | 9/1957 | Brilmyer . |
| 3,057,246 | 10/1962 | Brilmyer . |
| 3,066,568 | 12/1962 | Armour . |
| 3,122,050 | 2/1964 | Wenson . |
| 3,203,300 | 8/1965 | Marschner . |
| 3,215,024 | 11/1965 | Brilmyer et al. . |
| 3,290,982 | 12/1966 | Marschner . |
| 3,415,553 | 12/1968 | Baugh . |
| 3,425,259 | 2/1969 | Baugh . |
| 3,464,306 | 9/1969 | Reynolds et al. . |
| 3,915,053 | 10/1975 | Ruhl . |
| 4,136,596 | 1/1979 | Davis, Jr. . |
| 4,198,895 | 4/1980 | Ruhl . |
| 4,221,152 | 9/1980 | Jason . |
| 4,299,519 | 11/1981 | Corbett . |
| 4,472,096 | 9/1984 | Ruhl et al. . |
| 4,587,829 | 5/1986 | Sukharevsky . |
| 4,597,263 | 7/1986 | Corbett . |
| 4,768,910 | 9/1988 | Rath . |
| 4,813,834 | 3/1989 | Smith . |
| 4,867,625 | 9/1989 | Dixon . |
| 4,878,372 | 11/1989 | Port et al. . |
| 4,900,205 | 2/1990 | Sadri . |
| 4,921,384 | 5/1990 | Nordyke . |
| 4,943,196 | 7/1990 | Dahl . |
| 4,950,115 | 8/1990 | Sadri . |
| 4,977,663 | 12/1990 | Hurd . |
| 5,090,852 | 2/1992 | Dixon . |
| 5,125,778 | 6/1992 | Sadri . |
| 5,228,817 | 7/1993 | Cosenza . |
| 5,315,755 | 5/1994 | Fulbright et al. . |
| 5,527,140 | 6/1996 | Mages et al. . |

*Primary Examiner*—Flemming Saether
(74) *Attorney, Agent, or Firm*—Harness Dickey & Pierce P.L.C.

(57) ABSTRACT

A two piece fastener system for including a pin member and a collar having an optimized strength with the materials of the pin member and collar having a predetermined shear strength ratio; the collar has a preselected excess volume to provide a desired 'overpacking' condition and is of a size whereby after swage it will define a minimum wall thickness; the collar has an outer surface with a contour which in combination with a preselected excess volume results in a reduction in load required to swage the collar and with a pull type fastener providing a breakneck groove of reduced strength whereby severance of the pintail will occur at a reduced load resulting in a reduction in shock or ghost load applied to workpieces including those of a plastic or composite material.

36 Claims, 7 Drawing Sheets

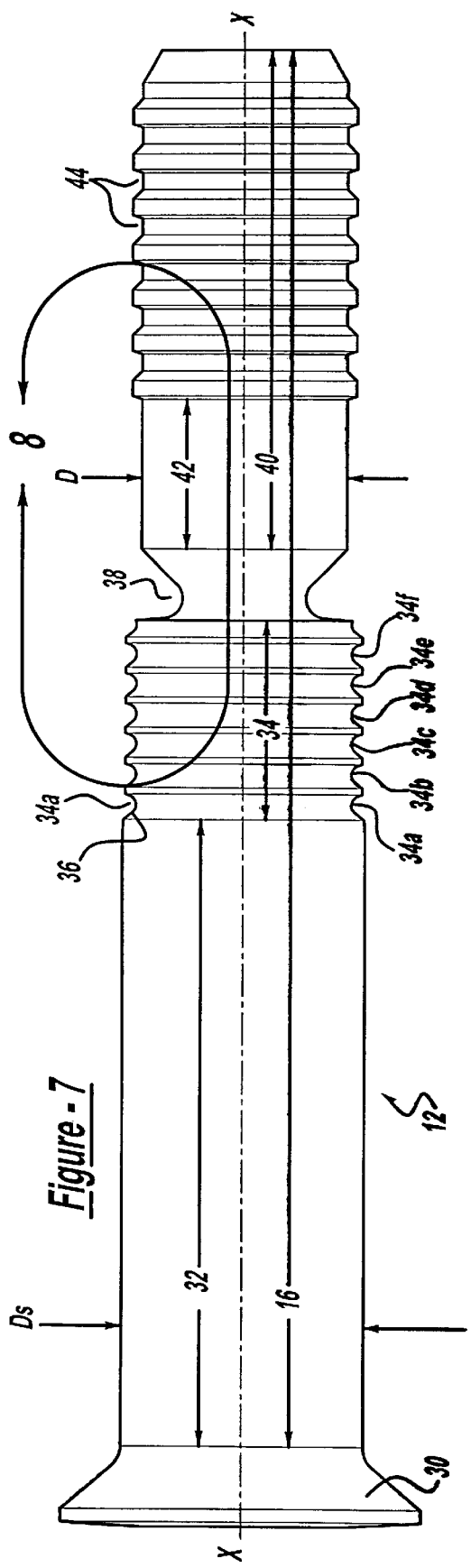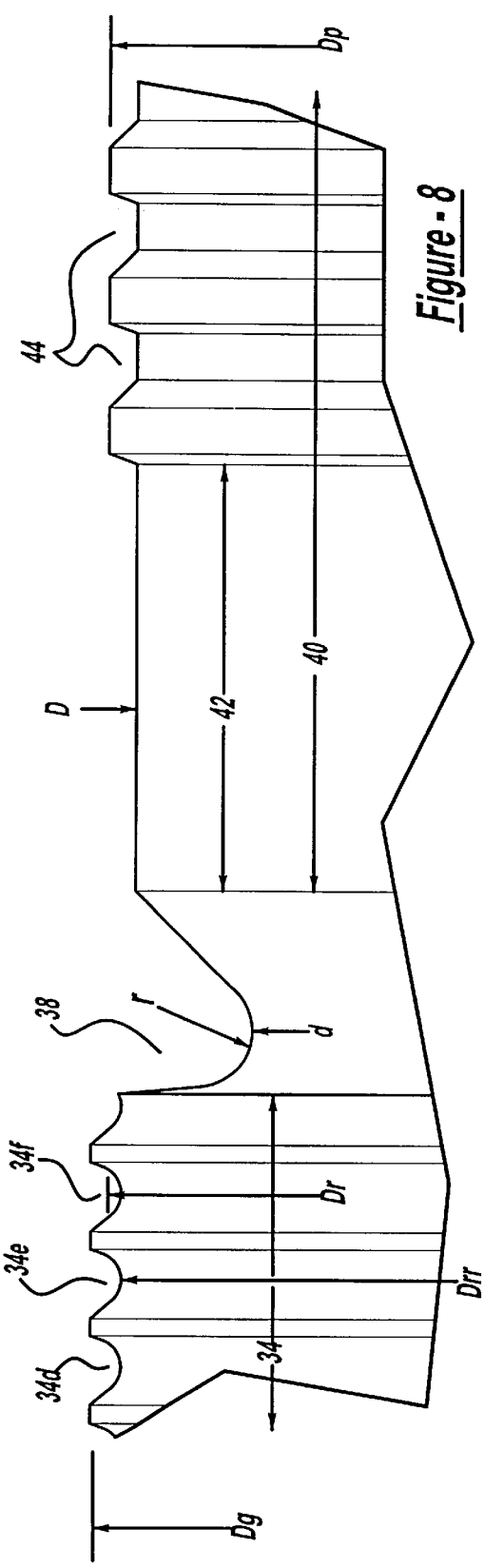

SWAGE TYPE FASTENER WITH LOW SWAGE LOAD

SUMMARY BACKGROUND OF THE INVENTION

The present invention relates to two piece, swage type fasteners including a pin and collar with the collar adapted to be swaged into lock grooves in the pin. Swage fasteners can be of a pull type or a non-pull stump type. Swage fasteners of the pull type include a pin with a pintail section having pull grooves adapted to be gripped by an installation tool and severed at a breakneck groove after completion of swage. The present invention is directed to a fastener having a unique construction in which the loads required for collar swage have been decreased. This also permits a reduction in the load required to sever the pintail section. At the same time, the construction of the present invention also provides a fastener of an optimized design having a preselected strength and at a minimized installed weight similar to existing pull type swage fasteners of optimized design but which require higher swage and pintail severance loads. The low swage load construction is also advantageous with non-pull type or stump type swage fasteners.

In the past, such optimized swage type fasteners were made of a unique design with significance given to strength and to the minimization of weight. These fasteners were especially directed for use in the aerospace industry where weight is an important factor. Such a swage type fastener of optimized design is shown and described in U.S. Pat. No. 4,472,096 to J. Ruhl and R.

Dixon issued Sept. 18, 1984. As will be seen the present invention is related to the concepts of the '096 patent and, like the fasteners of the '096 patent, is also related to the concepts for two piece swage type fasteners such as those illustrated in U.S. Pat. No. 3,915,053 to J. Ruhl, issued Oct. 28, 1975. Since the concepts of both the '096 and '053 patents are fully described therein a detailed description of these concepts is omitted for purposes of brevity and simplicity.

Swage type fasteners are used for a variety of different applications including the joining of workpieces of various types of materials with a predetermined clamp force. In aircraft applications for example the workpieces can be of a lightweight metal such as aluminum and/or of a lightweight plastic, composite material. The composite structure for example can be of graphite-epoxy materials or other similar type of plastic materials.

Such plastic or composite materials generally have a lower impact strength than metal workpieces and hence such workpieces when clamped by fasteners are subject to localized delamination or crushing under excessive loading and pressure in a direction along the Z axis or normal to their end surfaces engaged by the fasteners. This is especially true where there is a slight space or gap between workpieces being secured. In this regard it is common in aerospace applications to have an inner workpiece of a composite material secured to an outer workpiece of a metallic material such as aluminum. Here thin resinous coatings or shims are usually applied to the inner composite workpiece between the mating surfaces to compensate for surface irregularities but which can still result in slight residual gaps. Upon securing the workpieces together with fasteners the composite workpiece may deflect at the area of gap proximate to the fasteners which may cause the localized delamination or crushing. To inhibit this the clamp loads for such plastic or composite workpieces are frequently distributed over a relatively larger area by use of collars with enlarged flanges for engaging the surface of the workpieces. Even here, however, for pull type fasteners, extra care must be taken to avoid damage to the plastic or composite material upon pin break in severing the pintail section. In this regard, it has been found that while pin break will occur at a predictable design load, a substantially higher load can be imposed on the workpieces resulting from a shock load occurring from pin break. The shock load, frequently referred to as a "ghost load", is caused by the release of stored energy in the fastener and fastened joint upon pin break which stored energy is developed by the relative axial forces which are applied for swage and pin break. The higher magnitude of shock or ghost load can result in localized delamination or crushing of the composite workpiece even though the magnitude of the swage load or pin break load would not. As noted this is most likely to occur where a gap, even though slight, is present between the inner composite workpiece and the outer metallic workpiece in the area of the fastener. Thus the pin break load results in a "ghost load" of even greater magnitude. The magnitude of the pin break load, however, is dictated to a great extent by the magnitude of the relative axial force required to complete the swaging of the collar. In other words, the collar must be fully swaged at a first relative axial force before the relative axial force is increased by a predetermined amount to a higher magnitude to sever the pintail. In this regard the load required to sever the pintail is typically around 10% greater than the swage load.

With the optimized lightweight fasteners of the '096 patent, weight is minimized in part by the use of a lightweight collar. However, in order to provide the desired high strength, the lightweight collar is required to be swaged into the lock grooves of the pin with a relatively high predetermined level of overpacking. Overpacking or overfill is provided by use of a collar with the swageable portion having a volume which is a preselected amount greater than the available volume between the swage cavity of the installation tool and the lock grooves. Conventional, non-optimized fasteners are constructed to have a relatively low level of overpacking. However, in the existing optimized fastener, while the swageable portion of the collar has been reduced in volume, the magnitude of overpacking is increased by modification of the other components of the system. This requires substantially higher swage loads than for the conventional, non-optimized fasteners. In the present invention it has been discovered that by providing the swageable portion of the collar with a minimized or slight reduction in volume, and hence minimization or slight reduction in the amount of overpacking, and with a unique external contour, the swage loads can be significantly reduced with essentially no loss of performance compared to existing, optimized fasteners constructed as shown in the '096 patent. At the same time the lower swage load permits there to be a substantial reduction in the magnitude of the load required to sever the pintail. The result is a substantial reduction in the shock load or "ghost load" resulting from pin break. Another advantage is the ability to use a lighter weight pull type installation tool since the installation loads are substantially reduced. Even, however, if the same sized tool is used the lower installation loads will contribute to longer life of the tool components. This latter advantage of reduced swage load also permits the use of lighter weight squeeze type installation tools for stump type swage fasteners and/or provides increased life of the larger existing tools. In addition, for pull type fasteners, there will be a reduction in the reaction force felt by the operator.

With pull type fasteners, the size of the pintail section with pull grooves can be reduced resulting in a saving in material cost which can be significant especially when the pins are constructed of relatively expensive materials such as titanium. In this regard the modified design of the collar results in a slight reduction in material and final weight of the collar and thus of the installed fastener. Also while the fastener system of the present invention has the advantages noted when used to secure workpieces of a composite material, although less critical re installation and/or shock load damage for metal workpieces, it also provides certain ones of the advantages for use in securing workpieces of metal. For example lighter weight tools could be employed; tool life could be increased and, for pull type fasteners, the reaction load felt by the operator at pin break could be reduced and the noise at pin break would be reduced. At the same time there still would be a savings in material costs.

Therefore it is an object of the present invention to provide a lightweight, swage fastener of a construction for installation at a reduced swage load while providing a fastened joint with substantially the same strength as comparable existing lightweight swage fasteners requiring a higher swage load.

It is another object of the present invention to provide a lightweight pull type swage fastener with a severable pintail section which can be installed with a reduced swage load and with a reduced load for severance of the pintail section while providing a fastened joint of substantially the same strength as comparable existing lightweight swage fasteners requiring higher swage and severance loads.

It is also an object of the present invention to provide a lightweight, pull type swage fastener for securing workpieces made of plastic, composite materials and which can be installed with a reduced swage load while providing a fastened joint of substantially the same strength as comparable existing lightweight swage fasteners requiring a higher swage load.

It is another object of the present invention to provide a lightweight, pull type swage fastener with a severable pintail section for securing workpieces made of plastic, composite materials and which can be installed with a reduced swage load and a reduced load for severance of the pintail section resulting in reduced shock or ghost loads at severance whereby damage to the composite workpieces is inhibited while providing a fastened joint of substantially the same strength as comparable existing lightweight swage fasteners requiring a higher swage load.

It is still another object of the present invention to provide a lightweight pull type swage fastener with a severable pintail section and adapted to be installed with a reduced swage load and a reduced load for severance of the pintail section resulting in reduced shock or ghost loads while providing a fastened joint of substantially the same strength as comparable existing lightweight, swage fasteners requiring higher swage and severance loads.

It is another object of the present invention to provide a lightweight pull type swage fastener with a severable pintail section and adapted to be installed at a reduced swage load and a reduced load for severance of the pintail section with the construction of the pin and of the collar each providing a reduction in material.

Therefore, it is a general object of the present invention to provide an improved, lightweight fastening system including a swage type fastener of a construction such that it can be installed at a reduced swage load and, if of a pull type with a severable pintail section, it can be installed with a reduced load for severing the pintail section.

While the present invention is described primarily for a pull type fastener with a severable pintail section it should be understood that the low swage load construction can also be advantageously used with stump type fasteners such as shown in FIGS. 1–4 of the '096 patent. In this regard it should be understood that the low swage load construction of the present invention can be advantageously used with pull type swage fasteners without a severable pintail section in systems such as those shown and described in U.S. Pat. 5,315,755 to Fulbright and Smith issued May 31, 1994.

Other objects, features and advantages of the present invention will become apparent from the subsequent description and the appended claims, taken in conjunction with the accompanying drawings, in which:

BRIEF DESCRIPTION OF THE DRAWINGS

FIG. 7 is a longitudinal elevational view of the pin of FIG. 1 prior to location in the workpieces and assembly with the collar;

FIG. 8 is an enlarged fragmentary view of the portion of the pin of FIG. 7 taken generally in the Circle 8 in FIG. 7.

DETAILED DESCRIPTION OF EMBODIMENTS OF THE INVENTION

Figure 1:
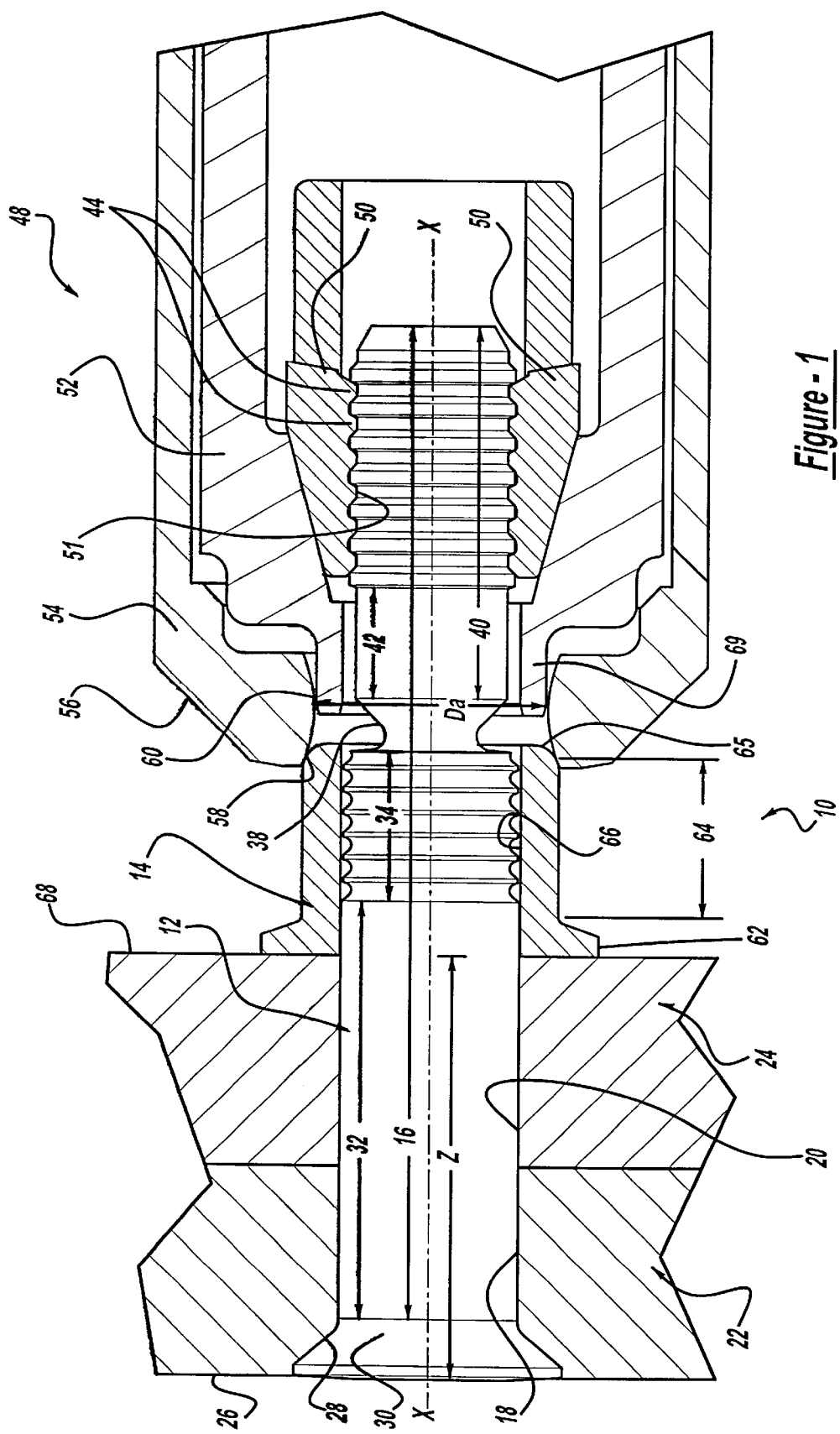
FIG. 1 is a longitudinal elevational view with some portions shown in section and others shown broken away of a pull type fastener of the present invention shown preassembled to workpieces to be secured together of a nominal grip or thickness and in engagement with an installation tool in preparation for installation.

As noted the principles of the present invention are advantageous for swage fasteners and particularly for pull type swage fasteners and especially for pull type swage fasteners with a severable pintail and for fastening a workpiece of plastic, composite type materials as noted. An example of such fastener is illustrated in the drawings.

Figure 2:
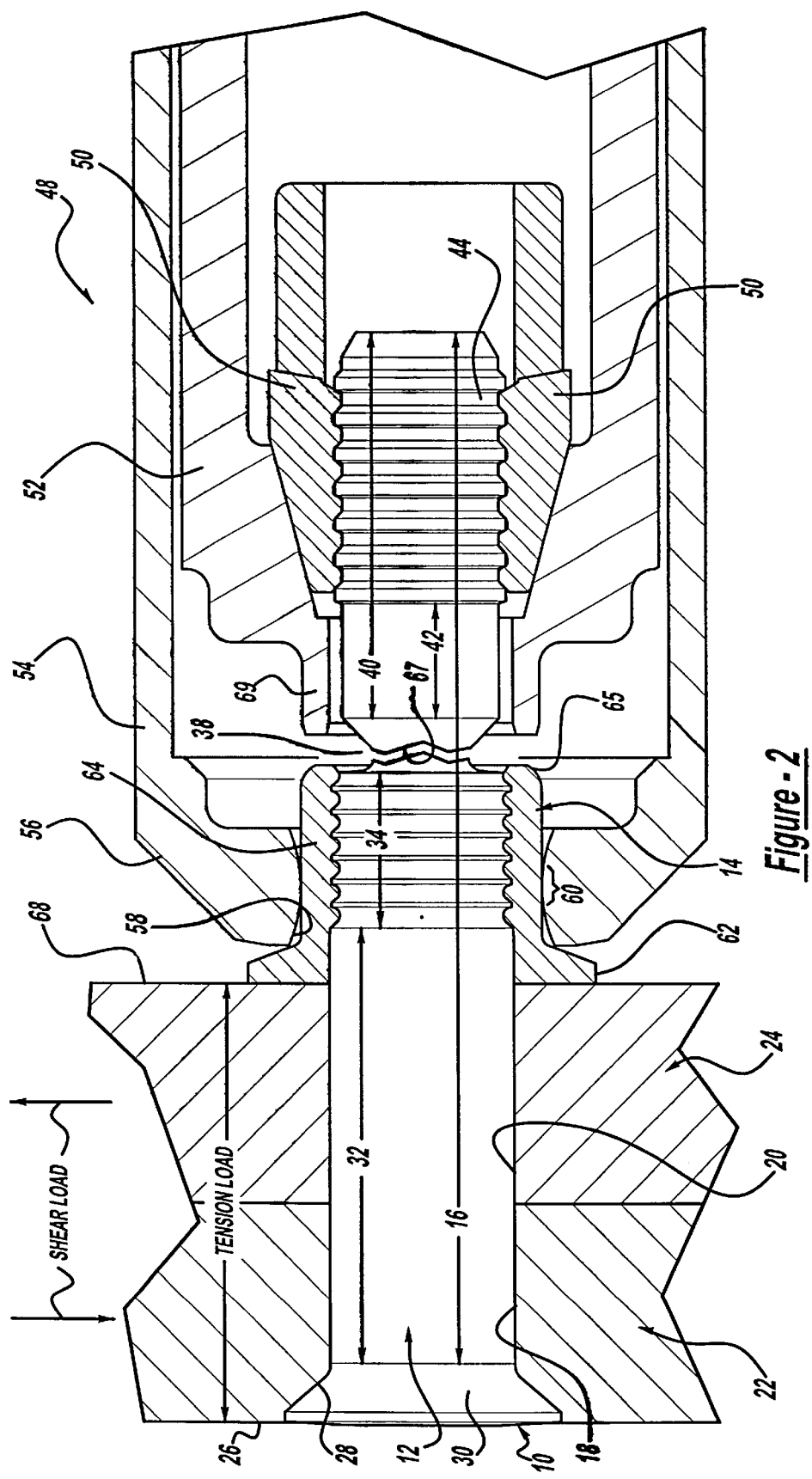
FIG. 2 is a view similar to that of FIG. 1 showing the fastener after it has been set but with the installation tool still engaged and with the pintail section severed.
Figure 3:
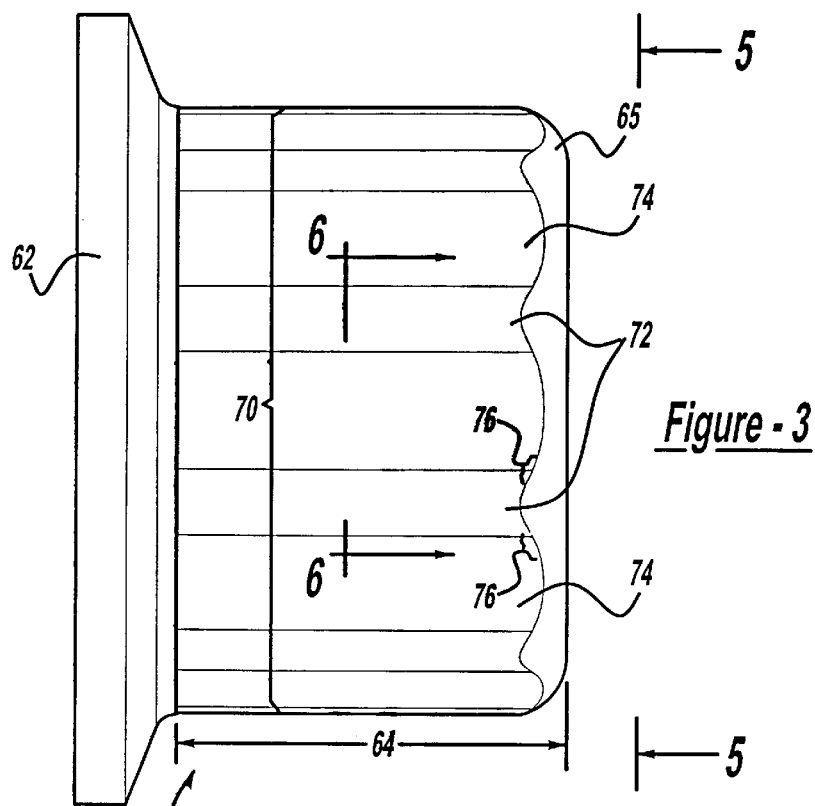
FIG. 3 is a side elevational view to enlarged scale of the collar of FIG. 1 prior to assembly.
Figure 4:
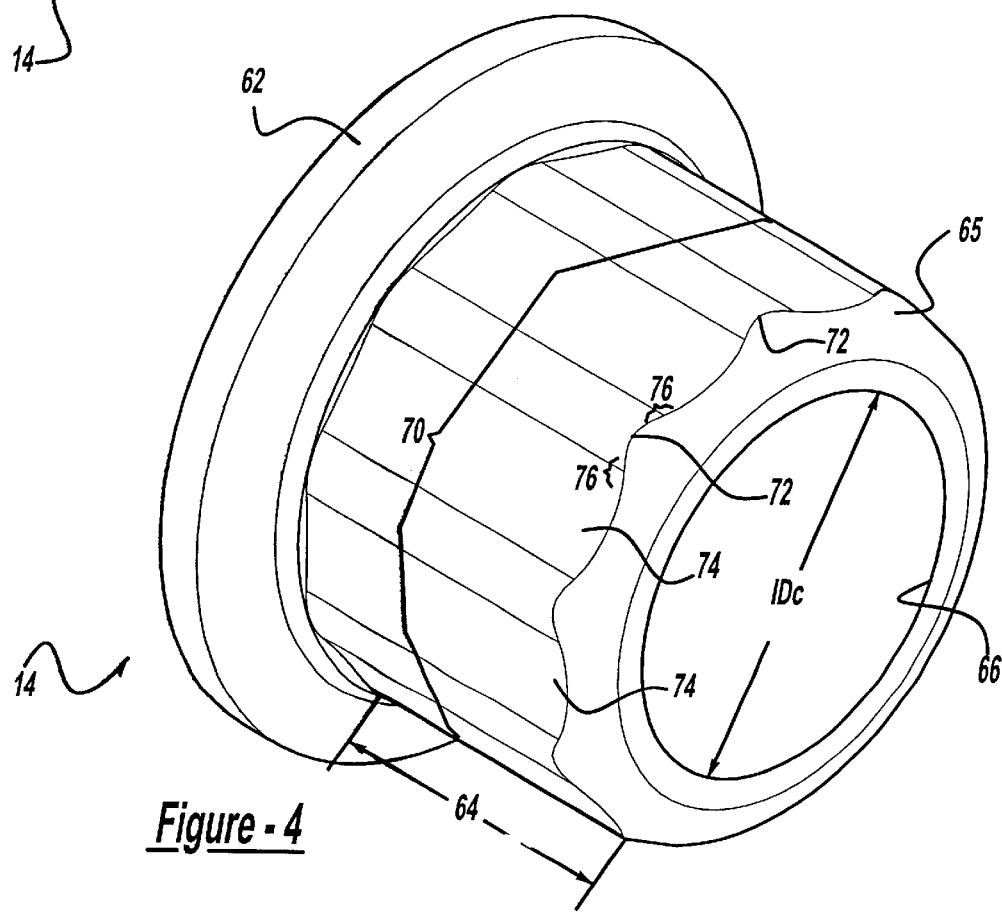
FIG. 4 a pictorial view of the collar of FIGS. 1 and 3.
Figure 5:
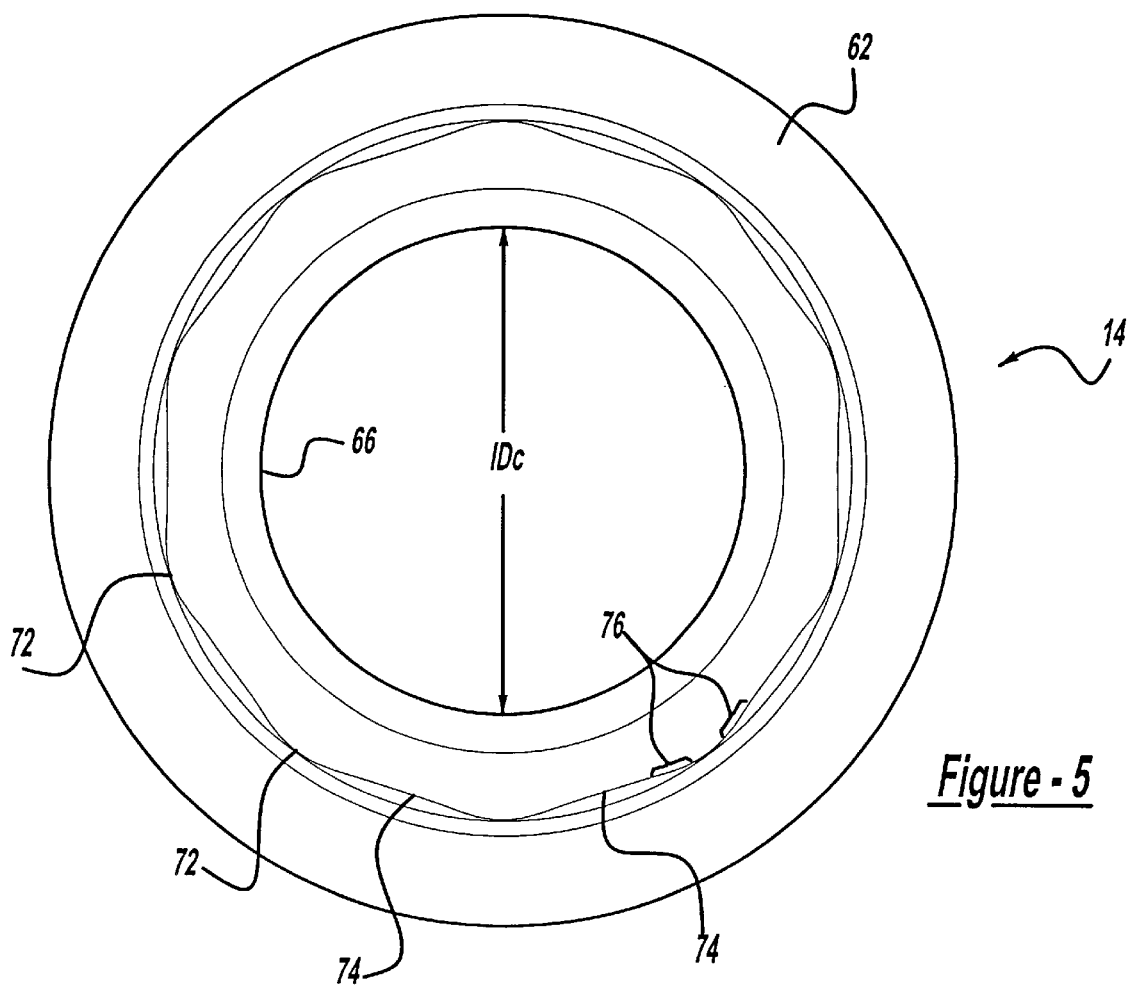
FIG. 5 is an end elevational view of the collar of FIGS. 1 and 3 taken generally in the direction of the Arrows 5–5 in FIG. 3.

Looking now to FIGS. 1 and 2, a fastener 10 of the present invention is shown and includes a pin 12 and a tubular, flanged collar 14. The pin 12 has an elongated shank 16 of a circular cross section with a central axis X which shank 16 can extend through aligned bores or openings 18 and 20 in a pair of workpieces 22 and 24, respectively, to be secured together. The X axis is colinear with a Z axis which is substantially normal to the end surfaces of the workpieces 22 and 24 and is central to the axis of bores or openings 18 and 20. In the embodiment shown, the workpieces 22 and 24 are made of lightweight materials, with the outer workpiece 22 being made of aluminum and the inner workpiece 24 being made of a plastic, composite material such as previously described. In this regard, it is typical for the metallic workpiece, such as workpiece 22, to be used as the outer workpiece since it is more resistant to the environment at that side. The opening 18 in the metallic workpiece 22 terminates at its front or outer side surface 26 in a countersunk bore portion 28 which is shaped to receive an enlarged flush type head 30 at one end of pin shank 16. Adjacent the pin head 30, the pin shank 16 has a straight, smooth portion 32 which, in one form of the invention, is adapted to be received within the bores 18 and 20 with a close tolerance fit. Following the straight shank portion 32 is a lock groove section 34 composed of a plurality of lock grooves 34a–f. A transition portion 36 smoothly connects the first lock groove 34 a with the straight shank portion 32 (see FIG. 7). The diameter Ds of the straight shank portion 32 is slightly greater than the diameter Dg of the crests of lock grooves 34a–f with Dg selected to provide a slightly greater clearance with openings 18 and 20.

A breakneck groove 38 located adjacent the lock groove section 34 is connected to a pintail section 40 and defines the weakest portion on the pin shank 16. The pintail section 40 includes a straight shank portion or land 42 located between the breakneck groove 38 and a plurality of pull grooves 44 at the outer end of the pintail section 40. The pull grooves 44 are adapted to be gripped by a tool 48 which is actuable to set the fastener 10. The tool 48 can generally be constructed in a manner known to those skilled in the art and hence has been only partially shown for purposes of simplicity. Briefly, the tool 48 has a plurality of jaws 50 having teeth 51 adapted to grip the pin 12 by mating engagement with the pull grooves 44. The jaws 50 are located in a tubular collet assembly 52 which is slidably supported in an anvil housing 54 which terminates at one end in a swage anvil 56 having an annular swage cavity 58 with an axially arcuately contoured throat 60 having a minimum diameter swage segment.

The symmetrically shaped, tubular collar 14 has an enlarged flange 62 at one end of a cylindrical shank portion 64 and is adapted to be located over the pin shank 16 with the flange 62 in engagement with the inner or back side surface 68 of workpiece 24. The flange 62 is provided to have a preselected surface area of engagement in order to distribute the installation and final clamp loads over a preselected area of the engaged workpiece surface such as inner surface 68. Where the workpieces include at least one of a composite material, such as workpiece 24, the engagement area of flange 62 is selected to be sufficient to resist localized delamination or crushing of the composite material at the inner or back side surface 68 of inner workpiece 24. In the present invention, the size of the collar flange 62 may be reduced in some applications because of the reduction in installation and/or shock loads. The collar 14 has a through bore 66 with a generally uniform diameter IDc. At the same time the diameter IDc of the collar bore 66 is selected to provide minimal clearance relative to the crests of the lock grooves 34a–f and with the smooth shank portion for preassembly and thus the diameter IDc is minimized to assist in minimizing the hoop strength of the collar shank portion 64 to assist in minimizing the required swage load. For example for a No. 8 size (nominal ¼ inch) fastener the diametrical clearance is held to around 0.002 inch relative to the diameter Ds of the smooth shank portion With the workpieces 22, 24 pulled together, the collar shank portion 64 will be in radial alignment with the lock grooves 34a–f. Note that workpieces 22 and 24 of FIGS. 1 and 2 have a combined thickness defining the nominal grip of the fastener 10, i.e. between the maximum and minimum total thickness of workpieces such as 22, 24 to be secured by fastener 10, and as shown the shank portion 64 of collar 14 will be aligned with and swaged into the lock grooves 34a–f (see FIG. 2). In the form of the invention shown, all of the lock grooves 34a–f will be filled in the nominal grip as shown. Upon actuation of the tool 48, a relative axial force is exerted between the pin 12 and collar 14 by the jaws 50 in gripping engagement with the pull grooves 44 and with the swage anvil 56 in engagement with the outer end of the collar shank portion 64.

In this regard, it should be noted that the collar shank portion 64 is provided with a radiused lead in section 65 which is adapted to guide and thus facilitate the initial insertion of the shank portion 64 into the swage cavity 58 of the swage anvil 56. As the relative axial force increases the collar shank portion 64 of collar 14 is swaged radially inwardly into the lock grooves 34a–f of pin 12 as the swage anvil 56 moves with the throat 60 of the swage cavity 58 overengaging the collar shank portion 64 (see FIG. 2). The collar shank portion 64 will be substantially fully swaged by the minimum diameter swage segment by the throat 60. It can be seen that while the first lock groove 34a may not be in full radial alignment with the throat segment with the minimum diameter, it will still be essentially filled by the material of the collar shank portion 64 which is forwardly extruded during swage. Upon completion of the swaging, the relative axial force between the pintail section 40 and the collar 14 will be increased to a magnitude at which the pintail section 40 is severed at the breakneck groove 38 such as at severance line 67. Upon further actuation of the tool 48, a collar ejector member 69 will then be urged forwardly to engage the end of collar shank portion 64 to eject the swaged collar 14 from the swage cavity 58 of anvil 56 thereby completing the installation.

It should be understood that a stump type form of fastener such as fastener 10 without the pintail section 40 can be set by a squeeze or impact type tool which includes a swaging anvil such as anvil 56 and a backup member engageable with the pin head 30 at the front side surface 26 of the workpiece 22. The anvil and back up member are actuable to be squeezed or impacted together to set the fastener. This type of tool also can be of a type well known to those skilled in the art such as generally shown in FIGS. 1 and 2 of the '096 patent and hence, for simplicity, has not been shown here.

The lock grooves 34a–f can be of a construction as shown in the '053 patent and of a shape proportioned in accordance with the relative shear strengths of the materials of the collar 14 and of the pin 12 in accordance with that patent. At the same time the lock grooves 34a–f can be constructed to provide proportioned shear stiffness also as shown in the '053 patent. Such lock groove structure is also shown in the '096 patent.

The optimization of the weight of the pin 12 and collar 14 of fastener 10 as installed is done in consideration of the particular loads as applied thereto via the workpieces 22 and 24. In many aerospace applications there are two areas of strength considerations for fasteners, one results from the loading of the pin 12 in shear and the other results from loading the pin 12 and collar 14 in tension. In the shear load mode, the shear stress, which results from opposite parallel force components on workpieces 22 and 24 (see FIG. 2), is taken diametrically across the straight pin shank portion 32 in a direction transverse to the axis Z. In the tension load mode the pin 12 is placed in tension as a result of opposite axial force components on workpieces 22 and 24, i.e. tending to pull them apart in a direction along the axis Z, which are transverse to the shear load. (See FIG. 2). In the design of aerospace shear type fasteners, it is common that the ultimate failure in tension loading occur through the shoulders defined by the grooves engaged. In this case the groove shoulders will fail in shear. Thus tension loading of the fastener 10 will place the interlocking grooves and shoulders between the lock grooves 34a–f of pin 12 and the swaged collar shank portion 64 in shear.

In optimizing a fastener structure, such as fastener 10, the starting point in any application is the magnitude of the shear load capability of the straight shank portion 32 of pin 12 and the magnitude of the tension load capability of the interlocking grooves and shoulders of pin 12 and collar 14. The magnitude of both the shear and tension loads are preselected by design and hence are known for a given application.

The determination and provision of shear load capability for a member such as pin 12 can be ascertained by well known means. Once having determined the minimum diameter of straight shank portion 32 to accommodate the design level of shear load, the fastener 10 can be optimized for minimum weight and size to accommodate the design level of tension load.

Thus after optimization for the design shear load, optimization of the design tension load capability for the fastener (such as fastener 10) is determined. The fastener 10, as noted however, is constructed such that the ultimate failure at the design tension load is expected to be in shear across the shoulders and grooves which are interlocked by swaging. These concepts are fully taught in the '096 patent and hence are within the purview of one skilled in the art and are not repeated for purposes of brevity and simplicity.

It should be noted that for some lightweight applications, such as aerospace, the material of the pin 12 is constructed of a costly, lightweight material such as titanium.

At the same time, it is typical to utilize a collar 14 made of a lightweight material such as titanium for use with a pin 12 made of titanium. Since titanium is a costly material, it is desirable, from a cost and material availability point to use as little titanium as possible. First the minimum required effective shear area for the shoulders defined by lock grooves 34a–f is determined and next the minimum, required effective shear area of the complementary shoulders of the swaged collar shank portion 64 is determined.

To optimize the fastener, however, it is desirable to minimize the total volume of material of that portion of the pin shank 16 required to carry the lock grooves 34a–f. This can be done by closely balancing the shear and tensile strengths of the material used in the collar 14 with that of pin 12. However, if the collar 14 is of excessive strength, damage to the shank 16 in the area of the lock grooves 34a–f may result during swage. In the present invention it is desirable to provide the collar 14 with as high a tensile yield strength as possible while avoiding the above noted damage. For this purpose, it has been found that tensile yields can be equated to ultimate material shear stress. By maximizing the strength of the collar 14 to a point where swaging can be accomplished just short of damage to the pin 12, the number and/or combined length of lock grooves 34a–f required to support the shear stress resulting from tension loading can be minimized; thus a selected ratio of lower collar strength to pin strength is desirable. It is also desirable, as noted, that the width of lock grooves 34a–f and shoulders defined thereby be proportioned relative to the shear strengths of the materials of pin 12 and collar 14 such that both the shoulders defined by lock grooves 34a–f of the pin 12 and the shoulders defined by interlocking grooves of the swaged collar shank portion 64 are in incipient or simultaneous failure in shear at the preselected maximum design tensile load on workpieces 22 and 24. In practice it is preferred that the design provide for the shoulders defined by the grooves of collar shank portion 64 to fail prior to the shoulders defined by lock grooves 34a–f of pin 12, i.e. the shoulders of pin 12 would fail in shear at approximately 110% of the tensile load at which the shoulders of the collar shank portion 64 would fail.

As previously noted, the lock grooves 34a–f and shoulders defined thereby can be further constructed to have proportioned shear stiffness in accordance with the '053 patent whereby failure in tension will occur substantially simultaneously at all of the shoulders associated with effective lock grooves 34a–f or all of the interlocking shoulders of swaged collar shank portion 64.

Utilizing the above criteria the volume of the shank 16 of pin 12 including the volume of the lock groove section 34 with lock grooves 34a–f can be minimized. Thus in the manner as described above the total volume and hence weight of the pin 12 will be minimized.

It is next desirable to minimize the volume and hence weight of collar 14. The shank portion 64 of collar 14 must include a sufficient volume to adequately fill the lock grooves 34a–f and an additional external volume sufficient to ensure the structural integrity and/or load transfer capability of the swaged collar shank portion 64. In attempting to minimize the volume of the collar shank portion 64, it has been determined that a significant factor is the provision of sufficient radial wall thickness to withstand the magnitude of the design tensile load for fastener 10 via workpieces 22 and 24 without a compressive type failure of the collar shank portion 64. Looking now to FIGS. 1–4 and 6 the minimum dimensions of the collar shank portion 64 to provide a minimum volume adequate to fill lock grooves 34a–f and yet to provide sufficient external structure to avoid compressive failure by a minimal, preselected margin can be predetermined in the manner as noted in the '096 patent. At the same time, as will be described, the outer surface 70 of collar shank portion 64 is provided with a unique, wave like contour which provides a significant reduction in swage load.

The throat 60 in swage cavity 58 is arcuately tapered to facilitate swaging and release of the anvil 56 after swage and hence Da is the minimum diameter of the swage segment of throat 60 in the swage area. Note that the diameter Da of the swage segment of the throat 60 relative to the volume of the collar shank portion 64 is selected to provide tight packing in lock grooves 34a–f with the material of swaged collar shank portion 64 to provide as complete a fill as possible. As noted the volume of collar shank portion 64 was selected to provide 'overpacking', i.e. a volume of collar shank portion 64 to provide substantially more volume of collar material for filling grooves 34a–f than they could normally accept within the swage envelope defined by the minimum diameter of the swage segment of the throat 60 of the swage cavity 58 and the confronting portion of pin 12.

Figure 6:
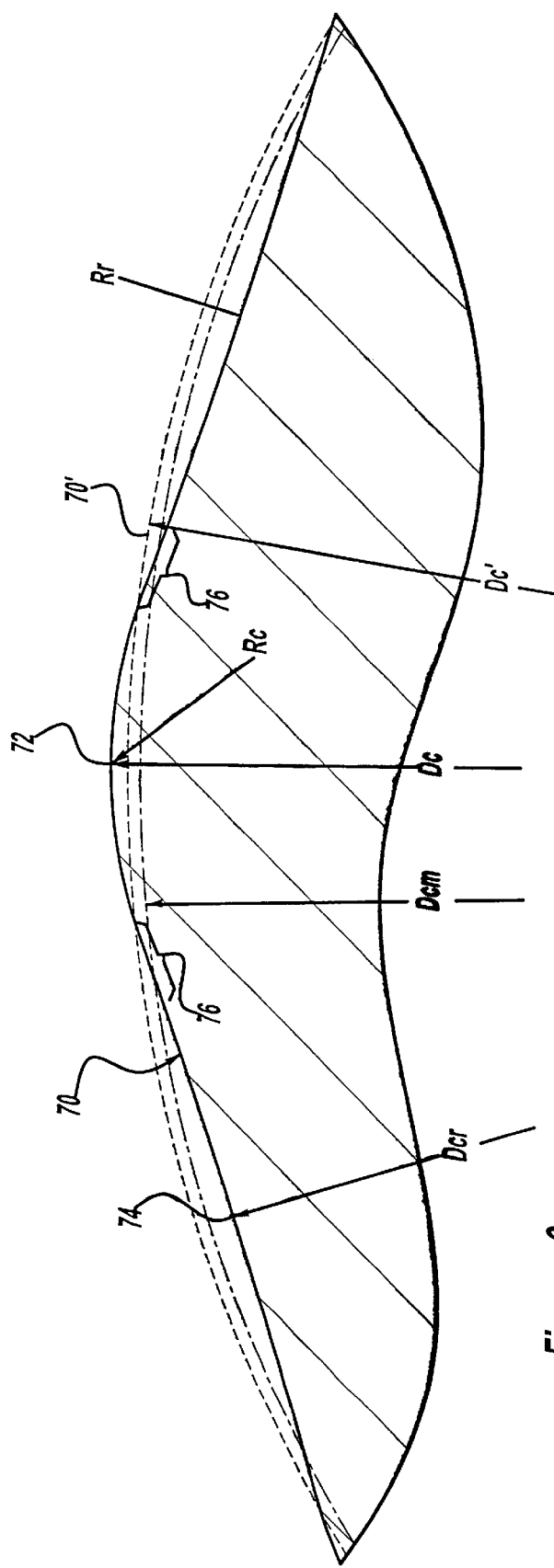
FIG. 6 is a fragmentary, sectional view to enlarged scale taken generally along the line 6–6 in FIG. 4 and depicting the wave like contour of the outer surface of the collar shank portion of the preinstalled collar of FIGS. 1, 3 and 5, with the mean diameter of the wave like contour shown in phantom lines, and with the outer, uniform contour of a preinstalled collar of a comparable existing optimized fastener shown in dashed lines.

In prior (non-optimized) systems, an excess of collar volume of around 13% has been used to provide a reasonably good fill of the associated lock grooves. This was done, however, with a collar shank of more volume than the optimized fastener but with an installation tool having a larger swage cavity whereby overfill and hence swage loads were less. At the same time, however, in prior optimized systems as per the '096 patent an excess volume greater than at least around 20% has been utilized. But this was done with a collar shank of less volume and with an installation tool having a smaller swage cavity. However, in order to secure the significant advantages of the present optimized system in a production environment the 'overfill' or 'overpacking' should be selected to be around 19% or within a range of between around 18% to no greater than around 20%. This is done, however, with a swage cavity of approximately the same size as that used for installation of the prior optimized fastener. The material of the collar 14 and pin 12 react to accommodate the excess volume, i.e. collar elongation through extrusion, etc. This does, however, assure that close to 100% fill of the lock grooves 34a–f will be realized after swage. When around the noted 19% 'overfill' has been utilized with such complete filling, it appears that a significant magnitude of shear stress capability (and hence tensile load capability) is realized in both the shoulders defined by lock grooves 34a–f of the pin 12 and the shoulders defined by the interlocking grooves of swaged collar shank portion 64 which capability is substantially the same as that of the existing optimized fastener with an 'overfill' of greater than at least around 20%. However, as will be seen the noted minimization or reduction in volume of the collar shank portion 64 slightly below the minimum volume noted for the prior optimized fastener of the '096 patent while resulting in a lower swage load will not alone achieve the desired, comparable high strength without a modification of the contour of the outer surface 70 of the collar shank portion 64. Thus, as shown in FIG. 6, the outer surface 70 is provided with a unique wave like contour with a blended radius construction which, with the noted minimization or reduction in volume, provides the desired, comparable high strength with the significant reduction in swage load.

As previously noted, it has been found that the amount of 'over fill' can be minimized or reduced which along with the unique wave like contour of the outer surface 70 will provide the high strength comparable to that of existing optimized, lightweight fasteners. This combination results in a significant reduction in the relative axial force required to swage the collar shank portion 64 into the lock grooves 34a–f. This also permits a corresponding reduction in the size of the breakneck groove 38 and in the overall size, of the pintail section 40.

Thus in one form of the invention, for a No. 8 size (nominal ¼ inch), the swage load was reduced by around 12%. In the pull type form of swage fastener, such as fastener 10, this resulted in a reduction in the breakneck fracture load of around 12% with a resultant reduction in the shock load or ghost load of around 20%.

Figure 9:
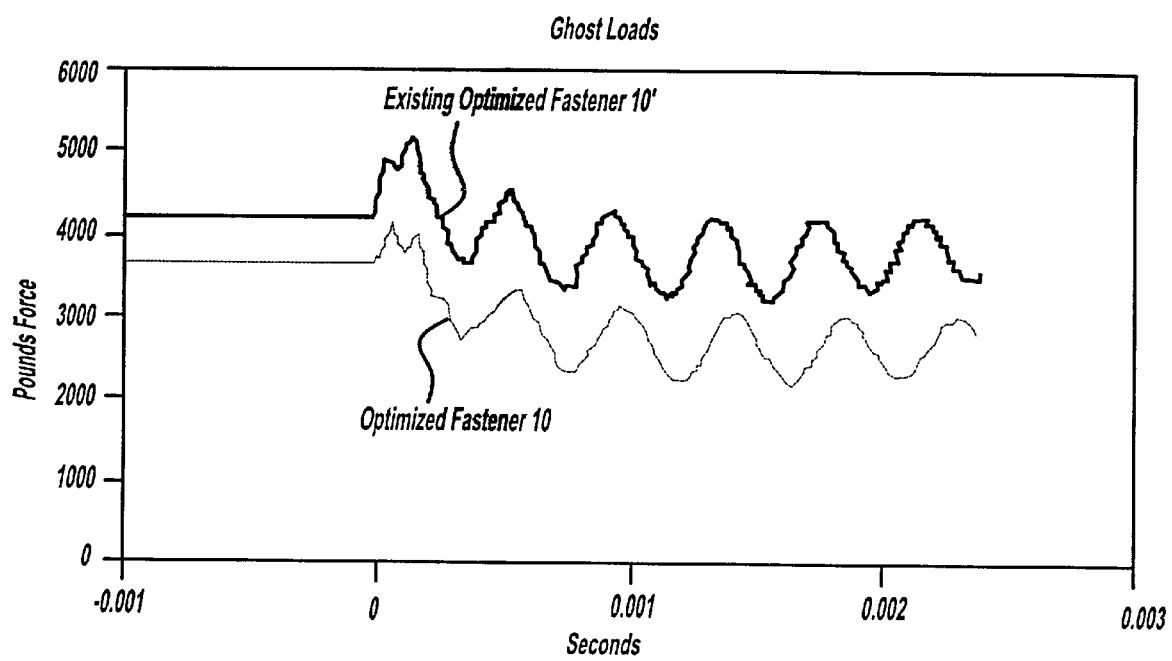
FIG. 9 is a graphical representation of the breakneck loads and ghost loads of a pull type fastener of the present invention in comparison to an existing optimized fastener of the same size which in FIG. 9 is a fastener of a No. 8 size (nominal ¼ inch diameter).

FIG. 9 is a graphical representation of standard tests using test plates, which operate as workpieces as secured by fasteners, and illustrating the magnitudes of the breakneck load and ghost load for the optimized fastener 10 of the present invention in comparison to those of the existing optimized fastener 10' for No. 8 size fasteners. The fracture of the breakneck grooves 38, 38' occurs at the zero time shown in the graphs after which the ghost load occurs. The significant reduction in breakneck load and resultant ghost load of the fastener 10 in comparison to the existing optimized fastener 10' is readily apparent from the graphs of FIG. 9. In this regard, the magnitudes of breakneck loads and ghost loads for the fasteners 10 and 10' are essentially the same with composite or metal workpieces. A significant factor in attaining this reduction in installation loads and achievement of the above results is realized, as noted, by modifying the outer surface 70 of the collar shank portion 64 to have a predetermined wave like contour such as is shown in FIG. 6.

Looking now to FIG. 6, the contour of the outer surface 70 of the collar shank portion 64 is shown to enlarged scale. It can be seen that the wave like contour includes arcuate crests 72 blended with arcuate roots 74.

The crests 72 have a radius Rc while the roots 74 are of a larger radius Rr. The curvatures of radius Rc and radius Rr are arcuately joined by blended radius sections 76. Thus at the blended radius sections 76 the curvatures of the crests 72 and roots 74 are essentially, smoothly tangentially blended together. The crests 72 define the maximum crest to crest diameter Dc of the outer surface 70 of the shank portion 64 while the roots 74 define the minimum root to root diameter Dcr of the outer surface 70. Thus the crests 72 and roots 74 define the outer surface to have a mean diameter Dcm. The mean diameter Dcm is shown in phantom lines in FIG. 6. The uniform outer surface of a comparable collar shank portion for an existing optimized fastener is shown in dotted lines designated with the numeral 70'. Thus it can be seen that the maximum diameter Dc of the crests 72 is greater than the uniform outside diameter Dc' of the comparable shank portion of existing optimized fasteners while the minimum diameter Dcr of the roots 74 is less than diameter Dc'. At the same time the uniform outside diameter Dc' of the existing comparable shank portion is greater than the mean diameter Dcm of the wave contour of the outer surface 70. The result is that the collar shank portion 64 will have a volume which is less than that of the shank portion of the collar of the existing optimized fastener. This results in a reduction in overfill volume from the greater than at least around 20% overfill of the existing optimized fastener to between around 18% to no greater than around 20%.

It also appears that the minimization of the number of lock grooves 34a–f and minimization of the overall length of the plurality of the grooves in combination with the 'overpacking' structure provides for good shear load transfer (via the associated shoulders) when in the tensile load mode. The percentage 'overfill' or 'overpacking' noted can be determined for a finite length (dl, see FIG. 1) at diameter Da of the effective swage portion of throat 60 by the relationship:

$$\frac{[(Dcm^2 - IDc^2) - (Da^2 - Dr^2)]dl}{[Da^2 - Dr^2]dl} = \% \text{ overfill}$$

where:
(1) 'dl' is considered to be a finite length within the swage portion of throat 60 ; See "Note" in ¶ (5);
(2) IDc is the inside diameter (inches) of the collar shank portion 64 (before swage);
(3) Dcm is the mean outside diameter (inches) of the outer surface 70 of collar shank portion 64 (before swage);
(4) Dr is the mean diameter (inches) of the available volume between the roots and crests of lock grooves 34a–f; and
(5) Da is the minimum diameter (inches) of the swage segment of throat 60 of the swage cavity 58 of swage anvil 56 in the area 'dl'; Note: in the present invention, however, because of the continuous arcuate contour of the swage segment of throat 60 the area 'dl' is minis-cule such that Da can be considered to be the diameter of the swage segment of throat 60; thus 'dl' is not shown in the drawings.

Note that the dimension Dr represents that diameter for the section of the lock grooves 34a–f which would provide a uniform, straight cylindrical shank if the material of the shoulders were used to fill the lock grooves 34a–f.

However, the unique outer surface 70 of collar shank portion 64 with the wave like configuration appears to facilitate and provide a more efficient flow of the collar material during swage whereby the desired, comparable high strength can be achieved at the reduced swage load.

In this regard, with the existing optimized fasteners it appears that during swage the excess collar material tends to partially accumulate as an annulus or ring in front of the swage anvil throat, such as throat 60, which ring of material is required to be moved axially towards the collar flange during swage. This ring of material resists the movement of the swage anvil throat during swage. In addition, the annulus or ring appears to increase in size as the swage anvil throat moves over the collar shank portion in swage. Thus its resistance to movement of the swage anvil throat appears to result in the relatively high swage loads for these fasteners. In the present invention, it is believed that the wave like contour of the outer surface 70 permits some of the excess material to flow from the crests 72 into the roots 74 which facilitates the forward flow of the excess collar material during swage resulting in less resistance and a significant reduction in swage load. In one form of the invention, it has been found that the outer surface 70 with ten waves has been optimal for the No. 8 (¼ inch) size fastener. However, it is believed that the outer surface 70 with between around eight to around sixteen similarly contoured waves with substantially the same minimization or reduction in volume would provide similar beneficial results. The number of waves selected and specific contour may vary with the size and/or material of the collar. In this regard a wave is considered to be the combination of one complete crest 72 and root 74. It is believed, however, that the waves should be formed such that the diameter Dc across crests 72 and diameter Dr across roots 74 should be within around 2% of the mean diameter Dm. At the same time it is also believed that the contour radius Rc of the crests 72 should generally be no greater than the contour radius Rr of the roots 74 and preferably should be substantially less. In one form of the invention for the No. 8 (¼ inch) size fastener the ratio of <u>root</u> radius R<u>r</u> to <u>crest</u> radius R<u>c</u> was around sixteen to one.

Note that it is desirable that a fastener of a given size be capable of securing workpieces varying in total thickness. The fastener 10 of FIGS. 1 and 2 has that capability. Thus, FIGS. 1 and 2 depict the fastener 10 with workpieces 22 and 24 having the nominal total thickness for that fastener. The fastener 10, however, can be used to secure workpieces having a greater or lesser total thickness. However, in order to minimize the size and weight of the fastener 10 the grip range is selected whereby all of the lock grooves 34a–f are effectively filled by the collar shank portion 64 in swage from minimum to maximum total thickness. It should be understood, however, that in certain applications a fastener, such as fastener 10, could be constructed with an additional lock groove, such as lock grooves 34a–f, with one less lock groove being filled at minimum and maximum grips whereby the grip range of the fastener could be increased.

As noted the volume of collar 14 is optimized by providing the minimum wall thickness at shank portion 64 whereby incipient or simultaneous failure at the tension design load can occur either through compressive failure, such as compressive yielding, or through shear of the shoulders defined by interlocking grooves of the collar 14 with shoulders defined by grooves 34a–f of the pin 12.

As noted the principles of the present invention are equally applicable to stump type, swage fasteners as can be seen in the '096 patent.

Looking now to FIGS. 7 and 8, the pintail section 40 can be reduced in size because of the reduced loads required to swage the collar shank portion 64 onto the pin 12. In this regard, as noted, the installation tool 48 can be essentially of the same size as that for installing the existing optimized fasteners at the increased load. In this case the pull grooves 44 will be of the same size and shape of those for the existing optimized fastener. However, because of the reduction in magnitude of the required swage load the number of pull grooves 44 can be reduced. This then permits the overall length of the pintail section 40 to be reduced resulting in a saving in material and hence cost. Thus it has been found that the number of pull grooves 44 required for one sized fastener can be reduced at least by one relative to the existing optimized fastener. In this regard, the pull grooves 44 are formed with shoulders having a crest diameter of Dpc and with grooves having a root diameter of Dpr. At the same time the diameter D of the adjacent smooth shank portion or land 42 is formed to be substantially the same as root diameter Dpr. This prevents interference between the smooth shank portion 42 and the teeth of the gripping jaws 50 in the event of overlapping conditions in gripping the pull grooves 44. It should also be noted that the diameter of the pintail section 40 could be reduced with an additional pull groove added to withstand the necessary load for swage. However, this would still result in an overall reduction in material and hence cost of the pin 12. At the same time a smaller, modified installation tool of lighter weight could be used.

A preferred form of the present invention is specifically directed for use in securing workpieces 22 and 24 with workpiece 22 being aluminum and workpiece 24 being of a composite material as described. The features of the fastener 10 which provide it with the noted advantages over the existing optimized lightweight fastener for securing composites can best be seen by a comparison of the two.

Thus the pin 12 will be of substantially the same material and construction as the existing, optimized pin except that pin 12 will have a pintail section 40 of reduced size and a modified breakneck groove 38 designed to fracture at a reduced relative axial force as described. The collar 14 will be of the same material and similar in design except for the collar shank portion 64. Here the differences are as described and include the reduction in volume and formation of the outer collar shank surface 70 with the unique wave like contour. In this regard, in one form of the invention the pin 12 was made of a titanium alloy 6Al-4V Titanium, Solution Treated and Aged, with a shear strength of around 95 KSI and with the lock grooves 34a–f, pull grooves 44 and breakneck groove 38 roll formed. At the same time the collar 14 was made of Commercially Pure, CP, titanium alloy and with a shear strength of around 65 KSI. The installation tool 48 will be the same including the swage anvil 56 and swage cavity 58 with the gripping jaws 50 adapted to grip the fewer pull grooves 44 of the pintail section 40 of reduced length as well as the larger number of pull grooves of the larger pintail section of the existing comparable fastener. In this regard,the pintail section 40 can have 6–7 pull grooves 44 engaged compared to 7–8 pull grooves engaged on the existing comparable fastener. It should be noted that while not all of the pull grooves will be engaged where the workpieces are of the nominal total thickness as shown in the drawings, one less pull groove may be engaged for the minimum and/or the maximum grip conditions.

Thus a fastener 10 of the present invention can have the following characteristics when compared to a comparable existing optimized, lightweight fastener of No. 8 size (nominal ¼ inch) with the similar components of the existing optimized, lightweight fastener given the same numeral designation but with the addition of a prime; linear dimensions are in inches with load values in pounds:

| | A. Pin 12 | | A. Pin 12' | |
|---|---|---|---|---|
| Material | Titanium Alloy, 6Al-4V | | Same | |
| Shear Strength | 95 KSI | | Same | |
| Straight Shank Portion 32, 32', Lock Groove Section 34, 34' | | | | |
| Ds | 0.248" | | Ds' | Same |
| Dg | 0.241" | | Dg' | Same |
| Dr | 0.230" | | Dr' | Same |
| Drr | 0.221" | | Drr' | Same |
| Pintail Section 40, 40' | | | | |
| D | .207" | | D' | Same |
| Dpc | .231" | | Dpc' | Same |
| Dpr | .211" | | Dpr' | Same |
| Number of Pull Grooves 44 | 7 | | Number of Pull Grooves 44' | 8 |
| Weight of Pintail Section 40 | 1.0 gram | | Weight of Pintail Section 40' | 1.7 gram |
| Breakneck Groove 38, 38' | | | | |
| d | .115" | | d' | 0.127" |
| D | .207" | | D' | .207" |
| r | .020" | | r' | 0.020" |
| | B. Collar 14 | | B. Collar 14' | |
| Material | CP Titanium Alloy | | Material | Same |
| Shear Strength | 65 KSI | | Shear Strength | Same |
| IDc | 0.250" | | IDc' | Same |
| Dc | .359" | | None | None |
| Dcr | .346" | | None | None |
| Dcm | .352" | | Dc' | .355" |
| Waves | 10 | | Waves | None |
| Crest Rc | .06" | | Crest | None |
| Root Rr | 1.00" | | Root | None |
| Dx | .326" | | Dx' | .326" |
| | C. Anvil 56 | | C. Anvil 56' | |
| Da | 0.3246" | | Da' | Same |
| D. Ultimate Shear Strength Ratio | | | | |
| Pin 12 to Collar 14 | 95 / 65 | | Pin 12' to Collar 14' | Same |
| E. Overpacking As per equation (3) | | | | |
| | 19% | | | 21.2% |
| F. SWAGE LOAD - TYPICAL | | | | |
| Fastener 10 | 2,600 | | Fastener 10' | 3,200 |
| G. BREAKNECK LOAD - TYPICAL | | | | |
| Fastener 10 | 3,700 | | Fastener 10' | 4,200 |
| H. GHOST LOAD - TYPICAL | | | | |
| Fastener 10 | 4,200 | | Fastener 10' | 5,200 |
| I. TENSILE STRENGTH - TYPICAL RANGE | | | | |
| Fastener 10 | 3,700–4,000 | | Fastener 10' | 3,500–3,700 |

The elements in the table noted above are as follows:
A. Pin 12, 12'
  1. Straight Shank Portion 32, 32', Lock Groove Section 34, 34';
    (a) Ds, Ds'—Diameter of straight shank portion 32, 32';
    (b) Dg, Dg'—crest diameter of lock grooves 34a–f, 34'a–f;
    (c) Drr, Drr'—Diameter of root of lock grooves 34a–f, 34'a–f;
    (d) Dr, Dr'—Mean diameter of lock grooves 34a–f, 34'a–f;
  2. Pintail Section 40, 40'
    (a) D, D'—Diameter of straight shank portion 42, 42';
    (b) Dpc, Dpc'—Crest diameter of pull grooves 44, 44';
    (c) Dpr, Dpr'—Root diameter of pull grooves 44, 44';
  3. Breakneck Groove 38, 38'
    (a) d, d'—Root diameter of breakneck groove 38, 38';
    (b) D, D'—Diameter of end of breakneck groove 38, 38' at straight shank portion 42, 42';
    (c) r, r'—Radius of breakneck groove 38, 38';
B. Collar 14, 14'
  (a) IDc, IDc'—Inside diameter of collar 14, 14';
  (b) Dc—Diameter across crests 72 of outer surface 70;
  (c) Dcr—Diameter across roots 74 of outer surface 70;
  (d) Dcm—Mean diameter of outer surface 70; Dc'—Uniform diameter of outer surface 70';
  (e) Crest Rc—Radius of curvature of crests 72;
  (f) Root Rr—Radius of curvature of roots 74;
  (g) Dx, Dx'—Mean diameter of swaged collar shank portion 64, 64';
C. Anvil 56, 56'
  (a) Da—Minimum diameter of anvil throat 60, 60';

The magnitudes in columns G. BREAKNECK LOAD and H. GHOST LOAD were determined by standard tests using test apparatus with test plates which, as previously noted, operate as workpieces secured by the fasteners 10 and 10'.

The magnitude of the breakneck load is essential a fixed magnitude regardless of the grip condition for that size fastener 10, i.e. securing workpieces such as 22 and 24 varying in total thickness from a maximum to a minimum. However, the magnitude of the swage load can vary between the maximum and the minimum grip conditions. Thus the load required for swage in a minimum grip, i.e. minimum total thickness of workpieces 22, 24, can be significantly greater than for maximum grip, i.e. maximum total thickness of workpieces 22, 24. As such the breakneck load is typically set to be around 10% higher than the maximum swage load, i.e. minimum grip, and thus can be around 30% higher than the minimum swage load, i.e. maximum grip. At the same time the resultant ghost load may be between around 10% to around 25% greater than the breakneck load. The examples noted in the preceding chart show a ghost load 14% greater for the fastener 10 of the present invention and a ghost load 24% greater for the existing optimized lightweight fastener 10'. Thus the reductions in breakneck loads of the present invention result in even a greater percentage reduction in the ghost loads.

Thus by employing the preceding teachings, including those of the '096 patent, and balancing the weight and strength of the fastener components significant reductions in overall size, weight and installation loads can be realized while still maintaining predetermined design criteria. The reduction in installation loads can also permit the use of lighter weight tools and/or result in increased tool life.

In this regard for the No. 8 size fastener 10 as described, the pin 12 with reduced pintail section 40 will have reduction in weight and hence material of the pintail section 40 of around 9% relative to the pintail section of the comparable existing lightweight fastener of the same size. At the same time the collar 14, for the No. 8 (¼ inch) size fastener 10, will have an overall reduction in weight and hence material of around 3% relative to the collar of the comparable existing lightweight fasteners.

It should be understood that where both the workpieces 22 and 24 are made of a material such as aluminum which is not subject to localized delamination or crushing then a collar, such as collar 14, could be used without a flange such as flange 62. Such a collar could be of a generally symmetrical, double ended type such as shown in the '096 patent and would have a swageable tubular shank portion constructed substantially as the shank portion 64 with an outer surface such as outer surface 70.

With regard to collars such as collar 14 of a double ended construction, i.e. without the flange 62, for use with metallic workpieces the reduction in weight and material for the No. 8 sized fastener will be between around 4% to 5%. Even with a collar of a double ended construction only a portion of the collar shank will be swaged into the lock grooves. In addition such a collar could be used to secure plastic or composite workpieces with a separate load washer engaged with the collar to distribute the load over a preselected area. Also while the pin 12 is shown with a flush type head 30, it should be understood that a pin such as pin 12 could be used having a protruding type head.

It should also be understood that the low swage concepts with a uniquely constructed collar shank portion, such as collar shank portion 64, for providing a high strength fastener, can employ pins, such as pin 12, but utilizing modified sections not affecting the low swage, high strength structure. For example the pin could be secured to one workpiece by welding, such as a weld stud, and be fastened by swaging a collar such as with a stump type fastener.

It should further be understood that, while the form of the present invention is shown to include a pin 12 and collar 14 constructed of titanium as noted, it is believed that significant reductions in swage load can be achieved utilizing other materials. For example the collar 14 could be constructed of an aluminum alloy such as 2024-T4 (1) having an ultimate shear strength of 41 KSI with a 10 wave structure for use with a titanium pin as described.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. In a fastening system, including a two piece fastener, for securing a plurality of workpieces together with the fastening system having a required preselected magnitude of design shear load and a required preselected magnitude of design tensile load and with said two piece fastener optimized to meet said design shear and tensile loads with a minimum weight for the materials utilized, said fastener comprising:

a pin member having an elongated shank including a smooth shank portion located in aligned openings in the workpieces and terminating in one end in an enlarged head and at its opposite end in a lock groove portion comprising a plurality of circumferentially extending lock grooves and associated lock groove shoulders, said smooth shank portion being of a preselected length relative to the combined thickness of the workpieces such that said lock groove portion will extend outwardly from the aligned openings, said smooth shank portion being of a diameter sufficient to provide the necessary shear strength to accept said design shear load, a tubular collar having a collar shank portion adapted to be swaged into said lock grooves whereby the workpieces are fastened together, said collar shank portion being of a preselected length sufficient to overlay and to be swaged into said lock grooves, said collar shank portion when swaged into said lock grooves having collar grooves and shoulders interlocking said lock grooves and lock groove shoulders, said pin member and said collar being of different materials having ultimate shear stresses of different magnitudes with the ratio of such shear stresses of said pin member to said collar being such that crushing of said pin member in swage is substantially avoided, said collar shank portion having a minimum average wall thickness, and hence weight, said collar shank portion having an outer surface having a circumferentially extending wave like contour with a plurality of waves defined by arcuate crests and arcuate roots smoothly connected, said outer surface being formed with between around 8 to around 16 waves, said collar shank portion adapted to be swaged into said pin lock grooves via a swage anvil having an effective throat swage portion, said collar shank portion having a predetermined volume of material which is between around 18% to no greater than around 20% greater than the available volume defined by said effective throat swage portion and the confronting portion of said pin lock grooves into which said collar is swaged, said predetermined volume of material and said waves contoured and selected to provide a reduced load required for swage while providing said required preselected design tensile and shear loads.

2. The fastening system of claim 1 with said crests defining a major diameter and said roots defining a minor diameter across said collar shank portion, said major and minor diameters defining a mean diameter across said collar shank portion, said major and minor diameters being within around 2% of said mean diameter.

3. The fastening system of claim 1 with said roots being defined by a radius of curvature generally around 16 times the radius of curvature of said crests, the arcuate curvature of said roots and said crests being generally tangentially blended together, said crests defining a major diameter and said roots defining a minor diameter across said collar shank portion, said major and minor diameters defining a mean diameter across said collar shank portion, said major and minor diameters being within around 2% of said mean diameter.

4. The fastening system of claim 1 with said roots being defined by a radius of curvature substantially greater than the radius of curvature of said crests, the arcuate curvature of said roots and said crests being generally tangentially blended together.

5. The fastening system of claim 1 with said roots being defined by a radius of curvature generally around 16 times the radius of curvature of said crests, the arcuate curvature of said roots and said crests being generally tangentially blended together.

6. The fastening system of claim 1 with said tubular collar having an enlarged flange at one end of said collar shank portion adapted to engage a confronting surface on the adjacent one of the workpieces.

7. The fastening system of claim 1 with said pin member prior to swage having a pintail section connected with said grooved portion by a breakneck groove, said pintail section having a plurality of pull grooves adapted to be gripped by teeth on jaws of a tool actuable for applying a relative axial force between said pin member and said collar, said breakneck groove adapted to fracture at a preselected axial force after completion of swaging, said preselected axial force being around 10% greater than the maximum magnitude of axial force required for swaging said collar shank portion into said lock grooves, said pintail section being of a minimum size to provide a minimum number of pull grooves to accept said preselected axial force for fracture of said breakneck groove.

8. The fastening system of claim 1 with said pin member prior to swage having a pintail section connected with said grooved portion by a breakneck groove, said pintail section having a plurality of pull grooves adapted to be gripped by teeth on jaws of a tool actuable for applying a relative axial force between said pin member and said collar, said breakneck groove adapted to fracture at a preselected axial force after completion of swaging, said preselected axial force being around 10% greater than the maximum magnitude of axial force required for swaging said collar shank portion into said lock grooves, said pintail section being of a minimum size to provide a minimum number of pull grooves to accept said preselected axial force for fracture of said breakneck groove, said fastener having a shock or ghost load occurring upon fracture of said pintail section with said ghost load being greater than said preselected axial force for fracture, said ghost load being around 15% greater than said preselected force for fracture.

9. The fastening system of claim 1 with said pin member prior to swage having a pintail section connected with said grooved portion by a breakneck groove, said pintail section having a plurality of pull grooves adapted to be gripped by teeth on jaws of a tool actuable for applying a relative axial force between said pin member and said collar, said breakneck groove adapted to fracture at a preselected axial force after completion of swaging, said preselected axial force being around 10% greater than the maximum magnitude of axial force required for swaging said collar shank portion into said lock grooves, said pintail section being of a minimum size to provide a minimum number of pull grooves to accept said preselected axial force for fracture of said breakneck groove, said fastener adapted to secure at least one workpiece made of a plastic material, said collar having an enlarged flange connected at one end of said collar shank portion, said fastener adapted to be installed with said collar flange located in engagement with a surface of said plastic workpiece, said fastener having a shock or ghost load occurring upon fracture of said pintail section with said ghost load being greater than said preselected axial force for fracture, said ghost load being around 15% greater than said preselected force for fracture, said ghost load being reduced to a magnitude at which fracturing or delamination of the engaged surface of said plastic workpiece is inhibited.

10. The fastening system of claim 1 with said different materials of said pin member and said collar being, for example, with said pin member being made of a titanium alloy having a tensile strength of around 95 KSI and said collar being made of a titanium alloy having a tensile strength of around 70 KSI.

11. The fastening system of claim 1 with said collar shank portion having around 10 waves.

12. The fastening system of claim 1 with said different materials of said pin member and said collar being, for example, with said pin member being made of a titanium alloy having a tensile strength of around 95 KSI and said collar being made of an aluminum alloy having a tensile strength of around 41 KSI, said collar shank portion having around 10 waves.

13. The fastening system of claim 1 with said crests defining a major diameter and said roots defining a minor diameter across said collar shank portion, said major and minor diameters defining a mean diameter across said collar shank portion, said major and minor diameters being within around 2% of said mean diameter, with said collar shank portion having around 10 waves.

14. The fastening system of claim 1 with said roots being defined by a radius of curvature generally around 16 times the radius of curvature of said crests, the arcuate curvature of said roots and said crests being generally tangentially blended together, said crests defining a major diameter and said roots defining a minor diameter across said collar shank portion, said major and minor diameters defining a mean diameter across said collar shank portion, said major and minor diameters being within around 2% of said mean diameter, with said collar shank portion having around 10 waves.

15. In a fastening system, including a two piece fastener, for securing a plurality of workpieces together with the fastening system having a required preselected magnitude of design shear load and a required preselected magnitude of design tensile load and with said two piece fastener optimized to meet said design shear and tensile loads with a minimum weight for the material utilized, said fastener comprising:

a pin member having an elongated shank including a smooth shank portion located in aligned openings in the workpieces and terminating in one end in an enlarged head and at its opposite end in a grooved portion comprising a plurality of circumferentially extending lock grooves and associated pin shoulders, said smooth shank portion being of a preselected length relative to the combined thickness of the workpieces such that said grooved portion will extend outwardly from the confines of the aligned openings, said smooth shank portion being of a diameter sufficient to provide the necessary shear strength to accept said design shear load, a tubular collar having a collar shank portion adapted to be swaged into said lock grooves whereby the workpieces are fastened together, said collar shank portion being of a length sufficient to overlay and to be swaged into said lock grooves, said swaged collar shank portion having collar grooves and shoulders interlocking said lock grooves and shoulders, said pin member and said collar being of different materials having ultimate shear stresses of different magnitudes with the ratio of such shear stresses of said pin member to said collar being such that crushing of said pin member in swage is substantially avoided, said collar shank portion having an outer surface having a circumferentially extending wave like contour with a plurality of waves defined by arcuate crests and arcuate roots smoothly connected, said outer surface being formed with between around 8 to around 16 waves, said roots being defined by a radius of curvature substantially greater than the radius of curvature of said crests, said collar shank portion adapted to be swaged into said lock grooves via a swage anvil having an effective throat swage portion, said collar shank portion having a predetermined volume of material which is generally between around 18% to around 20% greater than the available volume defined by said effective throat swage portion and the confronting portion of said lock grooves into which said collar shank portion is swaged.

16. The fastening system of claim 15 with said crests defining a major diameter and said roots defining a minor diameter across said collar shank portion, said major and minor diameters defining a mean diameter across said collar shank portion, said major and minor diameters being within around 2% of said mean diameter.

17. The fastening system of claim 15 with said roots being defined by a radius of curvature generally around 16 times the radius of curvature of said crests, the arcuate curvature of said roots and said crests being generally tangentially blended together, said crests defining a major diameter and said roots defining a minor diameter across said collar shank portion, said major and minor diameters defining a mean diameter across said collar shank portion, said major and minor diameters being within around 2% of said mean diameter.

18. The fastening system of claim 15 with said roots being defined by a radius of curvature generally around 16 times the radius of curvature of said crests, the arcuate curvature of said roots and said crests being generally tangentially blended together.

19. In a fastening system, including a fastener, for securing a plurality of workpieces within a selected grip range from a minimum to a maximum thickness and with the fastening system having a required preselected magnitude of design shear load and a required preselected magnitude of design tensile load and with said two piece fastener constructed to meet said design shear and tensile loads with a preselected minimum weight for the materials utilized, said fastener comprising:

a pin member having an elongated shank including a shank portion located in aligned openings in the workpieces and terminating in one end in an enlarged head and at its opposite end in a grooved portion comprising a plurality of circumferentially extending lock grooves and associated pin shoulders, said shank portion being of a preselected length relative to the combined thickness of the workpieces such that said grooved portion will generally extend for a minimum length beyond the confines of the aligned openings for the workpieces having a combined thickness at the maximum thickness of workpieces, a tubular collar having a collar shank portion adapted to be swaged into said lock grooves whereby the workpieces are fastened together, said tubular collar being of a preselected length sufficient to overlay and to be swaged into said lock grooves, said swaged collar shank portion having collar grooves and shoulders interlocking said lock grooves and shoulders, said pin member and said collar being of different materials having ultimate shear stresses of different magnitudes with the ratio of such shear stresses of said pin member to said collar being such that crushing of said pin member in swage is substantially avoided, said collar shank portion having an outer surface having a circumferentially extending wave like contour with a plurality of waves defined by arcuate crests and arcuate roots smoothly connected, said outer surface being formed with around 10 waves, said collar shank portion adapted to be swaged into said lock grooves via a swage anvil having an effective throat swage portion, said collar shank portion having a predetermined volume of material which is generally between around 18% to around 20% greater than the available volume defined by said effective throat swage portion and the confronting portion of said lock grooves into which said collar is swaged.

20. The fastening system of claim 19 with said crests defining a major diameter and said roots defining a minor diameter across said collar shank portion, said major and minor diameters defining a mean diameter across said collar shank portion, said major and minor diameters being within around 2% of said mean diameter.

21. The fastening system of claim 19 with said roots being defined by a radius of curvature generally around 16 times the radius of curvature of said crests, the arcuate curvature of said roots and said crests being generally tangentially blended together, said crests defining a major diameter and said roots defining a minor diameter across said collar shank portion, said major and minor diameters defining a mean diameter across said collar shank portion, said major and minor diameters being within around 2% greater than said mean diameter.

22. In a fastening system, including a fastener, for securing a plurality of workpieces within a selected grip range from a minimum to a maximum thickness and with the fastening system having a required preselected magnitude of design shear load and a required preselected magnitude of design tensile load and with said fastener constructed to meet said design shear and tensile loads with a preselected minimum weight for the materials utilized, said fastener comprising:

a pin member having an elongated shank including a shank portion located in aligned openings in the workpieces and terminating in one end in an enlarged head and at its opposite end in a grooved portion comprising a plurality of circumferentially extending lock grooves and associated pin shoulders, said shank portion being of a preselected length relative to the combined thickness of the workpieces such that said grooved portion will generally extend for a minimum length beyond the confines of the aligned openings for the workpieces having a combined thickness at the maximum thickness of workpieces, a tubular collar having a collar shank portion adapted to be swaged into said lock grooves whereby the workpieces are fastened together, said tubular collar being of a preselected length sufficient to overlay and to be swaged into said lock grooves, said swaged collar shank portion having collar grooves and shoulders interlocking said lock grooves and shoulders, said pin member and said collar being of different materials having ultimate shear stresses of different magnitudes with the pin member having a higher ultimate shear stress than said collar with the ultimate shear stress of said collar being selected such that crushing of said pin member during swage is substantially avoided, said collar shank portion having an outer surface having a circumferentially extending wave like contour with a plurality of waves defined by arcuate crests and arcuate roots smoothly connected, said outer surface being formed with between around 8 to around 16 waves, said crests defining a major diameter and said roots defining a minor diameter across said collar shank portion, said major and minor diameters defining a mean diameter across said collar shank portion, said major and minor diameters being within around 2% of said mean diameter, said collar shank portion adapted to be swaged into said lock grooves via a swage anvil having an effective throat swage portion, said collar shank portion having a predetermined volume of material which is generally around 19% greater than the available volume defined by said effective throat swage portion and the confronting portion of said lock grooves into which said collar shank portion is swaged.

23. The fastening system of claim 22 with said roots being defined by a radius of curvature generally around 16 times the radius of curvature of said crests, the arcuate curvature of said roots and said crests being generally tangentially blended together.

24. In a fastening system, including a fastener, for securing a plurality of workpieces within a selected grip range from a minimum to a maximum thickness and defining a selected grip range with the fastening system having a required preselected magnitude of design shear load and a required preselected magnitude of design tensile load and with said fastener constructed to meet said design shear and tensile loads with a preselected minimum weight for the material utilized, said fastener comprising:

a pin member having an elongated shank including a shank portion located in aligned openings in the workpieces and terminating in one end in an enlarged head and at its opposite end in a grooved portion comprising a plurality of circumferentially extending lock grooves and associated pin shoulders, said shank portion being of a preselected length relative to the combined thickness of the workpieces such that said grooved portion will generally extend for a preselected length beyond the confines of the aligned openings for the workpieces having a combined thickness at the maximum thickness of workpieces, a tubular collar having a collar shank portion adapted to be swaged into said lock grooves whereby the workpieces are fastened together, said tubular collar being of a minimum length sufficient to overlay and to be swaged into said lock grooves, said swaged collar shank portion having collar grooves and shoulders interlocking said pin grooves and shoulders, said pin member and said collar being of materials having ultimate shear stresses of different magnitudes with the ratio of such shear stresses of said pin member to said collar being such that crushing of said pin member in swage is substantially avoided, said collar shank portion adapted to be swaged into said lock grooves via a swage anvil having an effective throat swage portion, said collar shank portion having an outer surface having a circumferentially extending wave like contour with a plurality of waves defined by arcuate crests and arcuate roots smoothly connected, said outer surface being formed with between around 8 to around 16 waves, said roots being defined by a radius of curvature generally around 16 times the radius of curvature of said crests, the arcuate curvature of said roots and said crests being generally tangentially blended together, said collar shank portion having a predetermined volume of material which is generally between around 18% to around 20% greater than the available volume defined by said effective throat swage portion and the confronting portion of said lock grooves into which said collar is swaged.

25. The fastening system of claim 24 with said crests defining a major diameter and said roots defining a minor diameter across said collar shank portion, said major and minor diameters defining a mean diameter across said collar shank portion, said major and minor diameters being within around 2% of said mean diameter.

26. In a fastening system, including a two piece fastener, for securing a plurality of workpieces together with the fastening system having a required preselected magnitude of design shear load and a required preselected magnitude of design tensile load and with said two piece fastener optimized to meet said design shear and tensile loads with a minimum weight for the materials utilized, said fastener comprising:

a pin member having an elongated shank including a smooth shank portion located in aligned openings in the workpieces and terminating in one end in an enlarged head and at its opposite end in a lock groove portion comprising a plurality of circumferentially extending lock grooves and associated lock groove shoulders, said smooth shank portion being of a preselected length relative to the combined thickness of the workpieces such that said lock groove portion will extend outwardly from the aligned openings, said smooth shank portion being of a diameter sufficient to provide the necessary shear strength to accept said design shear load, a tubular collar having a collar shank portion adapted to be swaged into said lock grooves whereby the workpieces are fastened together, said collar shank portion being of a preselected length sufficient to overlay and to be swaged into said pin lock grooves, said collar shank portion when swaged into said pin lock grooves having collar grooves and shoulders interlocking said pin lock grooves and lock groove shoulders, said pin member and said collar being of different materials having ultimate shear stresses of different magnitudes with the ratio of such shear stresses of said pin member to said collar being such that crushing of said pin member in swage is substantially avoided, said collar shank portion having a minimum average wall thickness and hence weight, said collar shank portion having an outer surface having a circumferentially extending wave like contour with a plurality of waves defined by arcuate crests and arcuate roots smoothly connected, said outer surface being formed with between around 8 to around 16 waves, said roots being defined by a radius of curvature generally around 16 times the radius of curvature of said crests, the arcuate curvature of said roots and said crests being generally tangentially blended together, said collar shank portion adapted to be swaged into said pin lock grooves via a swage anvil having an effective throat swage portion, said collar shank portion having a predetermined volume of material which is generally around 19% greater than the available volume defined by said effective throat swage portion and the confronting portion of said pin lock grooves into which said collar is swaged, said predetermined volume of material and said waves contoured and selected to provide a reduced load required for swage.

27. In a fastening system, including a two piece fastener, for securing a plurality of workpieces together with the fastening system having a required preselected magnitude of design tensile load and with said two piece fastener optimized to meet said design tensile loads for the materials utilized, said fastener comprising:
- a pin member having an elongated pin shank extending through aligned openings in the workpieces and terminating at one end in a lock groove portion comprising a plurality of circumferentially extending lock grooves and associated lock groove shoulders, said pin shank being of a preselected length relative to the combined thickness of the workpieces such that said lock groove portion will extend for a preselected length beyond the confines of the aligned openings,
- a tubular collar having a collar shank portion adapted to be swaged into said lock grooves whereby the workpieces are fastened together, said collar shank portion being of a preselected length sufficient to overlay and to be swaged into said pin lock grooves, said collar shank portion when swaged into said pin lock grooves having collar grooves and shoulders interlocking said pin lock grooves and lock groove shoulders, said pin member and said collar being of different materials having ultimate shear stresses of different magnitudes with the ratio of such shear stresses of said pin member to said collar being such that crushing of said pin member in swage is substantially avoided,
- said collar shank portion having an outer surface having a circumferentially extending wave like contour with a plurality of waves defined by arcuate crests and arcuate roots smoothly connected, said outer surface being formed with between around 8 to around 16 waves,
- said collar shank portion adapted to be swaged into said pin lock grooves via a swage anvil having an effective throat swage portion,
- said collar shank portion having a predetermined volume of material which is generally between around 18% to around 20% greater than the available volume defined by said effective throat swage portion and the confronting portion of said pin lock grooves into which said collar is swaged,
- said predetermined volume of material and said waves contoured and selected to provide a reduced load required for swage,
- said pin member prior to swage having a pintail section connected with said grooved portion by a breakneck groove, said pintail section having a plurality of pull grooves adapted to be gripped by teeth on jaws of a tool actuable for applying a relative axial force between said pin member and said collar, said breakneck groove adapted to fracture at a preselected axial force after completion of swaging, said preselected axial force being around 10% greater than the magnitude of axial force required for swaging said collar shank portion shank portion into said lock grooves.

28. The fastening system of claim 27 with said crests defining a major diameter and said roots defining a minor diameter across said collar shank portion, said major and minor diameters defining a mean diameter across said collar shank portion, said major and minor diameters being within around 2% of said mean diameter.

29. The fastening system of claim 27 with said roots being defined by a radius of curvature generally around 16 times the radius of curvature of said crests, the arcuate curvature of said roots and said crests being generally tangentially blended together,
- said crests defining a major diameter and said roots defining a minor diameter across said collar shank portion, said major and minor diameters defining a mean diameter across said collar shank portion, said major and minor diameters being within around 2% of said mean diameter.

30. The fastening system of claim 27 with said pintail section being of a minimum size to provide a minimum number of pull grooves to accept said preselected axial force for fracture of said breakneck groove,
- said fastener having a shock or ghost load occurring upon fracture of said pintail section with said ghost load being greater than said preselected axial force for fracture, said ghost load being around 15% greater than said preselected force for fracture.

31. In a fastening system, including a two piece fastener, for securing a plurality of workpieces together with the fastening system having a required preselected magnitude of design tensile load and with said two piece fastener optimized to meet said design tensile loads for the materials utilized, said fastener comprising:
- a pin member having an elongated pin shank extending through aligned openings in the workpieces and terminating at one end in a lock groove portion comprising a plurality of circumferentially extending lock grooves and associated lock groove shoulders, said pin shank being of a preselected length relative to the combined thickness of the workpieces such that said lock groove portion will extend for a preselected length beyond the confines of the aligned openings,
- a tubular collar having a collar shank portion adapted to be swaged into said lock grooves whereby the workpieces are fastened together, said collar shank portion being of a preselected length sufficient to overlay and to be swaged into said pin lock grooves, said collar shank portion when swaged into said pin lock grooves having collar grooves and shoulders interlocking said pin lock grooves and lock groove shoulders, said pin member and said collar being of different materials having ultimate shear stresses of different magnitudes with the ratio of such shear stresses of said pin member to said collar being such that crushing of said pin member in swage is substantially avoided,
- said collar shank portion having an outer surface having a circumferentially extending wave like contour with a plurality of waves defined by arcuate crests and arcuate roots smoothly connected, said outer surface being formed with between around 8 to around 16 waves,
- said collar shank portion adapted to be swaged into said pin lock grooves via a swage anvil having an effective throat swage portion,
- said collar shank portion having a predetermined volume of material which is generally between around 18% to around 20% greater than the available volume defined by said effective throat swage portion and the confronting portion of said pin lock grooves into which said collar is swaged,
- said predetermined volume of material and said waves contoured and selected to provide a reduced load required for swage,
- said pin member prior to swage having a pintail section connected with said grooved portion by a breakneck groove, said pintail section having a plurality of pull grooves adapted to be gripped by teeth on jaws of a tool actuable for applying a relative axial force between said pin member and said collar, said breakneck groove adapted to fracture at a preselected axial force after completion of swaging, said preselected axial force being around 10% greater than the maximum magnitude of axial force required for swaging said collar shank portion shank portion into said lock grooves, said fastener adapted to secure at least one workpiece made of a plastic material, said collar having an enlarged flange connected at one end of said collar shank portion, said fastener adapted to be installed with said collar flange located in engagement with a surface of said plastic workpiece, said fastener having a shock or ghost load occurring upon fracture of said pintail section with said ghost load being greater than said preselected axial force for fracture, said ghost load being around 15% greater than said preselected force for fracture, said ghost load being reduced to a magnitude at which fracturing or delamination of the engaged surface of said plastic workpiece is inhibited.

32. The fastening system of claim 31 with said crests defining a major diameter and said roots defining a minor diameter across said collar shank portion, said major and minor diameters defining a mean diameter across said collar shank portion, said major and minor diameters being within around 2% of said mean diameter.

33. The fastening system of claim 31 with said roots being defined by a radius of curvature generally around 16 times the radius of curvature of said crests, the arcuate curvature of said roots and said crests being generally tangentially blended together, said crests defining a major diameter and said roots defining a minor diameter across said collar shank portion, said major and minor diameters defining a mean diameter across said collar shank portion, said major and minor diameters being within around 2% of said mean diameter.

34. The fastening system of claim 31 with said different materials of said pin member and said collar being, for example, with said pin member being made of a titanium alloy having a tensile strength of around 95 KSI and said collar being made of a titanium alloy having a tensile strength of around 70 KSI.

35. The fastening system of claim 31 with said different materials of said pin member and said collar being, for example, with said pin member being made of a titanium alloy having a tensile strength of around 95 KSI and said collar being made of a titanium alloy having a tensile strength of around 70 KSI, with said collar shank portion having around 10 waves.

36. In a fastening system, including a two piece fastener, for securing a plurality of workpieces together with the fastening system having a required preselected magnitude of design tensile load and with said two piece fastener optimized to meet said design tensile loads for the materials utilized, said fastener comprising:

a pin member having an elongated pin shank extending through aligned openings in the workpieces and terminating at one end in a lock groove portion comprising a plurality of circumferentially extending lock grooves and associated lock groove shoulders, said pin shank being of a preselected length relative to the combined thickness of the workpieces such that said lock groove portion will extend for a preselected length beyond the confines of the aligned openings, a tubular collar having a collar shank portion adapted to be swaged into said lock grooves whereby the workpieces are fastened together, said collar shank portion being of a preselected length sufficient to overlay and to be swaged into said pin lock grooves, said collar shank portion when swaged into said pin lock grooves having collar grooves and shoulders interlocking said pin lock grooves and lock groove shoulders, said pin member and said collar being of different materials having ultimate shear stresses of different magnitudes with the ratio of such shear stresses of said pin member to said collar being such that crushing of said pin member in swage is substantially avoided, said collar shank portion having an outer surface having a circumferentially extending wave like contour with a plurality of waves defined by arcuate crests and arcuate roots smoothly connected, said outer surface being formed with between around 8 to around 16 waves, said collar shank portion adapted to be swaged into said pin lock grooves via a swage anvil having an effective throat swage portion, said collar shank portion having a predetermined volume of material which is generally between around 18% to around 20% greater than the available volume defined by said effective throat swage portion and the confronting portion of said pin lock grooves into which said collar is swaged, said predetermined volume of material and said waves contoured and selected to provide a reduced load required for swage, said pin member prior to swage having a pintail section connected with said grooved portion by a breakneck groove, said pintail section having a plurality of pull grooves adapted to be gripped by teeth on jaws of a tool actuable for applying a relative axial force between said pin member and said collar, said breakneck groove adapted to fracture at a preselected axial force after completion of swaging, said preselected axial force being around 10% greater than the magnitude of axial force required for swaging said collar shank portion shank portion into said lock grooves, said fastener adapted to secure at least one workpiece made of a plastic material, said collar having an enlarged flange connected at one end of said collar shank portion, said fastener adapted to be installed with said collar flange located in engagement with a surface of said plastic workpiece, said fastener having a shock or ghost load occurring upon fracture of said pintail section with said ghost load being greater than said preselected axial force for fracture, said ghost load being around 15% greater than said preselected force for fracture, said ghost load being reduced to a magnitude at which fracturing or delamination of the engaged surface of said plastic workpiece is inhibited, with said roots being defined by a radius of curvature generally around 16 times the radius of curvature of said crests, the arcuate curvature of said roots and said crests being generally tangentially blended together, said crests defining a major diameter and said roots defining a minor diameter across said collar shank portion, said major and minor diameters defining a mean diameter across said collar shank portion, said major and minor diameters being within around 2% of said mean diameter, with said different materials of said pin member and said collar being, for example, with said pin member being made of a titanium alloy having a tensile strength of around 95 KSI and said collar being made of a titanium alloy having a tensile strength of around 70 KSI, with said collar shank portion having around 10 waves.

* * * * *